M. M. HART & R. W. CARPENTER.
FLUID LEVEL INDICATOR.
APPLICATION FILED FEB. 27, 1914.
1,133,023.
Patented Mar. 23, 1915.
2 SHEETS—SHEET 2.
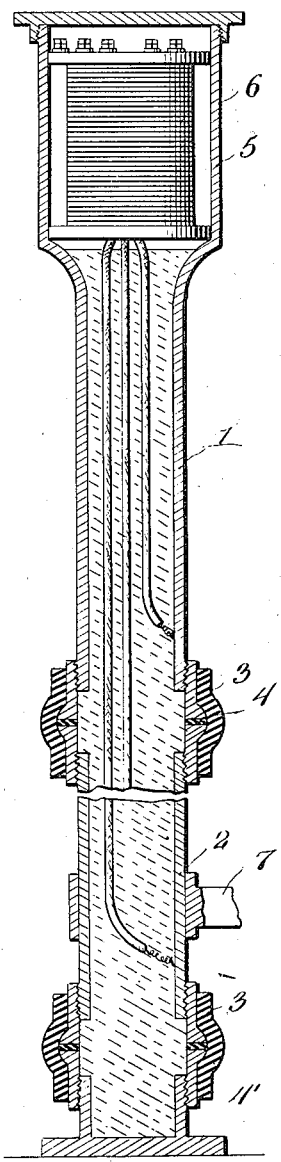
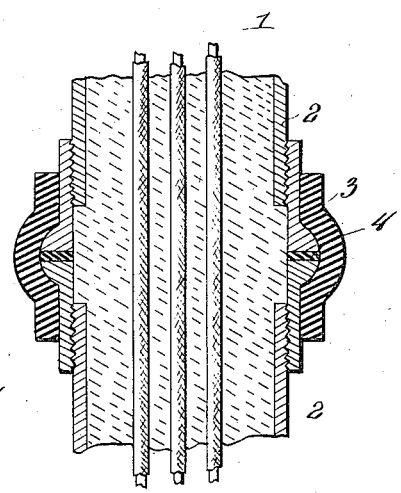
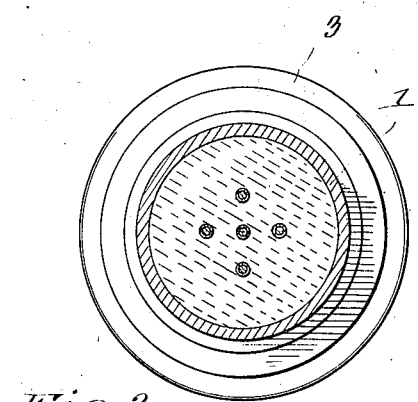
Inventors
M. M. Hart.
R. W. Carpenter.
By Victor J. Evans
Attorney
Witnesses
W. R. Smith
John J. McCarthy

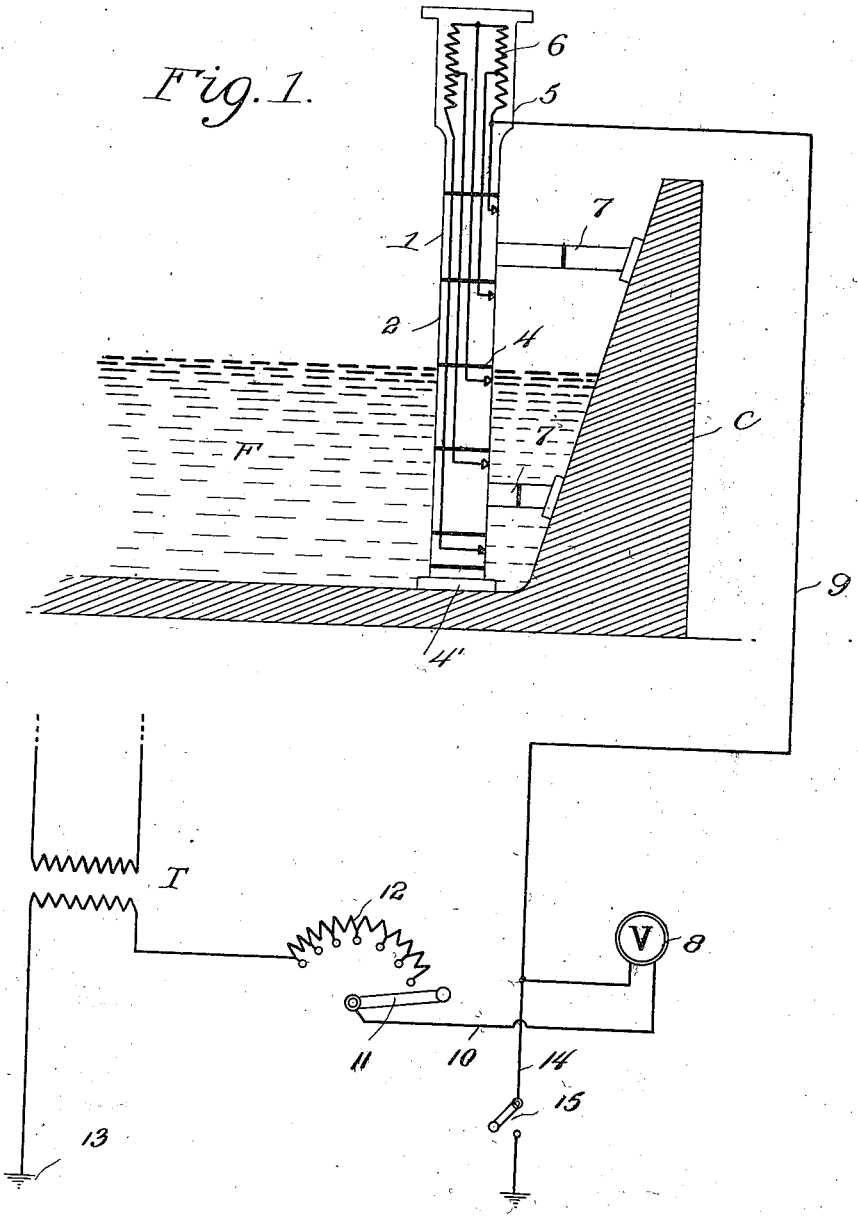

UNITED STATES PATENT OFFICE.

MORTIMER M. HART AND RALPH W. CARPENTER, OF WEISER, IDAHO.

FLUID-LEVEL INDICATOR.

1,133,023.　　　Specification of Letters Patent.　　Patented Mar. 23, 1915.

Application filed February 27, 1914. Serial No. 821,610.

*To all whom it may concern:*

Be it known that we, MORTIMER M. HART and RALPH W. CARPENTER, citizens of the United States, residing at Weiser, in the county of Washington and State of Idaho, have invented new and useful Improvements in Fluid-Level Indicators, of which the following is a specification.

This invention relates to improvements in fluid level indicators and has particular application to an electrically controlled indicator.

In carrying out the present invention, it is our purpose to provide an indicator of the class described whereby the rise and fall of the body of fluid will be automatically indicated so that the condition thereof may be ascertained at any time and which will embody among other features a column located within the body of fluid and comprising a plurality of sections insulated one from another and a resistance coil having the turns thereof connected with the sections and diminishing in number as the distance between the sections and the bottom of the reservoir or container increases so that as the water level rises and falls the turns of the resistance coil will be automatically cut out of and into service, a measuring instrument being connected in circuit with the resistance coil and the body of fluid and under the control of the latter so that as the fluid level rises the resistance will be automatically cut out of the circuit and the instrument actuated to denote the height of the water, while when the water level falls the resistance is automatically placed in circuit with the indicating instrument and the latter actuated to denote the fall of the body of fluid.

It is also our purpose to provide a fluid level indicator which will embrace the desired features of simplicity, efficiency and durability, one which may be installed and maintained at a minimum expense and one whereby an accurate reading may be at all times obtained.

With the above and other objects in view, the invention consists in the construction, combination and arrangement of parts hereinafter set forth in and falling within the scope of the claims.

In the accompanying drawings: Figure 1 is a diagrammatic view of a fluid level indicator constructed in accordance with the present invention. Fig. 2 is a vertical sectional view through the column located in the body of fluid. Fig. 3 is a transverse sectional view through the same. Fig. 4 is an enlarged fragmentary sectional view through the column showing the manner of connecting the sections.

Referring now to the accompanying drawings in detail, C designates a suitable form of container or reservoir designed to contain a body of fluid F. Located within the container C is a vertical column or casing 1 comprising a plurality of sections 2 having the meeting ends connected together through the medium of an appropriate form of coupling 3 and insulated from one another as at 4. The lower section 2 of the column is connected with a supporting block or foot 4' seated upon the bottom of the container and each section is of any desired length. Detachably connected with the upper open end of the column 1 is an inverted cup-shaped cap 5 carrying a resistance coil 6 having the poles thereof connected with the section 2 and diminishing in number as the distance between the sections and the bottom of the container increases so that as the fluid within the container rises the resistance sections will be cut out of service, while when the fluid level falls the resistance sections will be placed in service. In the present instance, the column 2 is reinforced by means of arms 7, 7 secured to the side wall of the container and the column.

A measuring instrument 8 in the form of a volt-meter calibrated to read in feet is connected in circuit with the resistance coil and the body of fluid, a conductor 9 connecting one terminal of the measuring instrument with the resistance coil, while the remaining terminal of the instrument is connected by way of a conductor 10 with an arm 11 movable over a resistance grid 12, the resistance grid being connected with the secondary winding of a transformer T, such secondary winding being grounded as at 13.

In practice, the primary winding of the transformer is connected up with a suitable source of electrical energy and as the level of the body of fluid F within the container C rises the turns of the resistance coil are automatically cut out of the circuit, current flowing from one side of the secondary winding of the transformer through the resistance grid 12, arm 11, conductor 10, measuring instrument 8, conductor 9, the respective turns of the resistance coil, the section 2 in contact with the upper surface of the fluid and then back to the other side of the secondary winding of the transformer by way of the earth.

A conductor 14 has one terminal connected with the conductor 9 and the opposite end grounded and located in the conductor 14 is a switch 15. By means of the switch 15 the resistance coil 6 may be short circuited and the measuring instrument 8 tested, while any variation in the voltage of the current from the source of supply may be compensated for by the arm 11 and resistance 12.

From the foregoing description taken in connection with the accompanying drawing, the construction, mode of operation and manner of employing our invention will be readily apparent.

While we have herein shown and described one preferred form of our invention by way of illustration, we wish it to be understood that we do not limit or confine ourselves to the precise details of construction herein described and delineated, as modification and variation may be made within the scope of the claims without departing from the spirit of the invention.

The column or casing 1 is preferably packed with suitable insulating material in order that the wires therein will be thoroughly insulated from one another and sweating eliminated.

We claim:

1. In a fluid level indicator, the combination with a fluid body, of a column therein comprising a plurality of sections insulated one from another, a resistance coil having the turns thereof connected with said sections and diminishing in number as the height of the sections increase, and a measuring instrument connected in circuit with said resistance coil and the body of fluid whereby as the water level rises and falls the measuring instrument will be actuated to indicate the height of the fluid.

2. In a fluid level indicator, the combination with a fluid body, of a column therein comprising a plurality of sections insulated one from another, a resistance coil having the turns thereof connected with said sections and diminishing in number as the height of the sections increase, a measuring instrument connected in circuit with said resistance coil and the body of fluid whereby as the water level rises and falls the measuring instrument will be actuated to indicate the height of the fluid, and means for short circuiting said resistance coil and testing said instrument.

3. In a fluid level indicator, the combination with a fluid body, of a column therein comprising a plurality of sections insulated one from another, a cap closing the upper end of said column, a resistance coil carried by said cap within the latter and having the turns thereof connected with said sections and diminishing in number as the height of the sections increase, and a measuring instrument connected in circuit with said resistance coil and the body of fluid whereby as the water level rises and falls the instrument will be actuated to give the level of the fluid.

4. In a fluid level indicator, the combination with a fluid body, of a column therein comprising a plurality of sections, couplings connecting the meeting ends of the sections, means insulating the sections one from another, a cap carried by the upper end of said column, a resistance coil within said cap and having the turns thereof connected with said sections and diminishing in number as the height of the sections increase, and a measuring instrument connected in circuit with said resistance coil and the body of fluid.

5. In a fluid level indicator, the combination with a fluid body, of a column therein comprising a plurality of sections, couplings connecting the meeting ends of the sections, means insulating the sections one from another, a cap carried by the upper end of said column, a resistance coil within said cap and having the turns thereof connected with said sections and diminishing in number as the height of the sections increase, a measuring instrument connected in circuit with said resistance coil and the body of fluid, a transformer having the secondary winding thereof connected in circuit with said instrument and resistance sections and the primary winding connected in circuit with a source of supply, and means for compensating for any variation in voltage in said secondary winding.

In testimony whereof we affix our signatures in presence of two witnesses.

MORTIMER M. HART.
RALPH W. CARPENTER.

Witnesses:
JAMES W. GALLOWAY,
JAMES HARRIS.